US012297013B2

(12) United States Patent
Nagaoka et al.

(10) Patent No.: US 12,297,013 B2
(45) Date of Patent: May 13, 2025

(54) LIQUID REFILL CONTAINER FOR REFILLING LIQUID DISCHARGE APPARATUS WITH LIQUID, AND REUSE SYSTEM USING LIQUID REFILL CONTAINER

(71) Applicant: CANON KABUSHIKI KAISHA, Tokyo (JP)

(72) Inventors: Kyosuke Nagaoka, Tokyo (JP); Ryoji Inoue, Kanagawa (JP); Naozumi Nabeshima, Tokyo (JP); Keiichiro Tsukuda, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 46 days.

(21) Appl. No.: 18/332,624

(22) Filed: Jun. 9, 2023

(65) Prior Publication Data

US 2023/0322449 A1 Oct. 12, 2023

Related U.S. Application Data

(63) Continuation of application No. 17/556,254, filed on Dec. 20, 2021, now Pat. No. 11,708,197.

(30) Foreign Application Priority Data

Feb. 25, 2021 (JP) ................................ 2021-028711

(51) Int. Cl.
*B65D 47/12* (2006.01)
*B41J 2/175* (2006.01)

(52) U.S. Cl.
CPC ............ *B65D 47/122* (2013.01); *B41J 2/175* (2013.01); *B65D 2547/063* (2013.01)

(58) Field of Classification Search
CPC .. B65D 47/122; B65D 2547/063; B41J 2/175; B41J 2/17506; B41J 2/17509; B41J 2/1754
See application file for complete search history.

(56) References Cited

U.S. PATENT DOCUMENTS

| | | | | |
|---|---|---|---|---|
| 4,848,947 A * | 7/1989 | Kremer | A46B 11/0013 | 401/206 |
| 5,024,355 A * | 6/1991 | Jouillat | B05B 11/0064 | 222/162 |
| 5,722,830 A * | 3/1998 | Brandhorst | A61C 9/0026 | 433/90 |
| 2002/0079692 A1 | 6/2002 | Pennaz | | |

(Continued)

FOREIGN PATENT DOCUMENTS

| | | |
|---|---|---|
| CH | 616350 A5 * | 3/1980 |
| JP | 2002079689 A | 3/2002 |

(Continued)

*Primary Examiner* — Bob Zadeh
(74) *Attorney, Agent, or Firm* — Canon U.S.A., Inc. IP Division

(57) ABSTRACT

A liquid refill container for refilling a liquid discharge apparatus with liquid includes a liquid storage portion, a pouring portion, and a cap portion. The liquid storage portion is made of a metal and contains liquid. The pouring portion is removeably connected to the liquid storage portion and has an outlet for pouring the liquid. The cap portion is removeably attached to the pouring portion and covers the outlet.

11 Claims, 7 Drawing Sheets

(56) References Cited

U.S. PATENT DOCUMENTS

| | | | | |
|---|---|---|---|---|
| 2002/0118259 | A1* | 8/2002 | Ranganathan ....... | B41J 2/17523 347/85 |
| 2006/0221148 | A1* | 10/2006 | Okazaki ............... | B41J 2/17596 347/85 |
| 2011/0240677 | A1* | 10/2011 | Dwyer .................. | B05B 11/028 222/321.2 |
| 2012/0067926 | A1* | 3/2012 | Ishikawa ................ | B65D 47/18 222/422 |
| 2017/0355195 | A1* | 12/2017 | Fukasawa ............ | B41J 2/17506 |
| 2019/0039381 | A1* | 2/2019 | Ishizawa .............. | B41J 2/17506 |
| 2021/0002062 | A1* | 1/2021 | Jasper ................... | B29C 66/112 |
| 2023/0322449 | A1* | 10/2023 | Nagaoka .............. | B41J 2/17509 222/562 |

FOREIGN PATENT DOCUMENTS

| | | | |
|---|---|---|---|
| JP | 2003321121 | A | 11/2003 |
| JP | 2005239178 | A | 9/2005 |
| JP | 2006206056 | A | 8/2006 |
| JP | 2013010518 | A | 1/2013 |
| JP | 2018065251 | A | 4/2018 |
| JP | 2020032708 | A | 3/2020 |

* cited by examiner

LIQUID REFILL CONTAINER FOR REFILLING LIQUID DISCHARGE APPARATUS WITH LIQUID, AND REUSE SYSTEM USING LIQUID REFILL CONTAINER

CROSS-REFERENCE TO RELATED APPLICATIONS

The present application is a continuation of U.S. patent application Ser. No. 17/556,254, filed on Dec. 20, 2021, which claims priority from Japanese Patent Application No. 2021-028711 filed Feb. 25, 2021, which are hereby incorporated by reference herein in their entireties.

BACKGROUND

Field

The present disclosure relates to a liquid refill container for refilling a liquid discharge apparatus with liquid, and a reuse system using a liquid refill container.

Description of the Related Art

As a liquid discharge apparatus typically an ink jet recording apparatus, there is known a liquid discharge apparatus in which a cartridge-shaped liquid storage tank is set in an apparatus main body and liquid is supplied from the liquid storage tank to a liquid discharge head of the liquid discharge apparatus.

On the other hand, a liquid discharge apparatus as described in Japanese Patent Laid-Open No. 2015-178280 has come to be used. In the liquid discharge apparatus, a liquid storage tank is fixed to the liquid discharge apparatus in advance, liquid is refilled from the outside to the liquid storage tank with the use of a bottle-shaped liquid refill container or the like, and the liquid storage tank is not replaced.

In the liquid discharge apparatus as described in Japanese Patent Laid-Open No. 2015-178280, liquid is refilled by opening the inlet of the liquid storage tank, removing a cap at the tip end of the liquid refill container, and inserting the tip end of the liquid refill container to the inlet. A liquid refill container entirely made of resin is generally used not only from the viewpoint that manufacturing through injection molding or the like is easy but also from the viewpoint of easiness of disposal after refilling of liquid is complete.

Resin liquid refill containers can be reused by separately collecting the liquid refill containers without simply disposing of the liquid refill containers and then, for example, melting the liquid refill containers. However, as a further direct reuse method, a method of filling a liquid refill container, which is empty as a result of pouring liquid, with liquid again without disposal is conceivable.

However, it is found that there is an inconvenience that, when liquid is repeatedly filled with the use of a liquid refill container entirely made of resin, the liquid refill container itself, particularly, a liquid storage portion directly containing liquid, degrades and, as a result, reuse becomes difficult.

SUMMARY

The present disclosure provides a liquid refill container suitable for reuse.

According to an aspect of the present disclosure, a liquid refill container for refilling a liquid discharge apparatus with liquid includes a liquid storage portion made of a metal and configured to contain liquid, a pouring portion removeably connected to the liquid storage portion and having an outlet for pouring the liquid, and a cap portion removeably attached to the pouring portion and covering the outlet.

Further features of the present disclosure will become apparent from the following description of exemplary embodiments with reference to the attached drawings.

DESCRIPTION OF THE EMBODIMENTS

Figure 1:
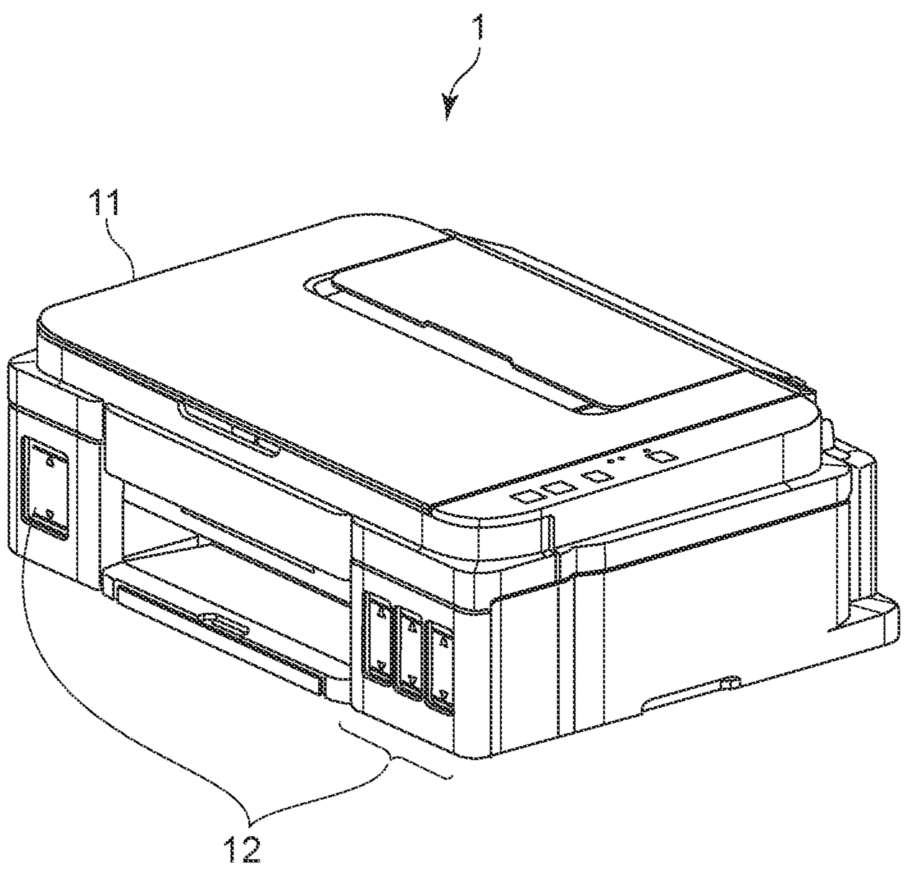
FIG. 1 is a perspective view showing the outer appearance of a liquid discharge apparatus.

Hereinafter, an embodiment of the present disclosure will be described with reference to the attached drawings. Like reference signs are assigned to portions having the same functions in the drawings, and the description thereof may be omitted.

Liquid Discharge Apparatus

A liquid discharge apparatus that is refilled with liquid from a liquid refill container will be described. FIG. 1 is a perspective view showing the outer appearance of the liquid discharge apparatus according to an embodiment of the present disclosure. The liquid discharge apparatus 1 shown in FIG. 1 is a so-called ink jet recording apparatus. The liquid discharge apparatus 1 shown in FIG. 1 includes a casing 11, and liquid storage tanks 12 disposed inside the casing 11. Each of the liquid storage tanks 12 contains ink that is liquid to be discharged to a record medium (not shown).

Figure 2:
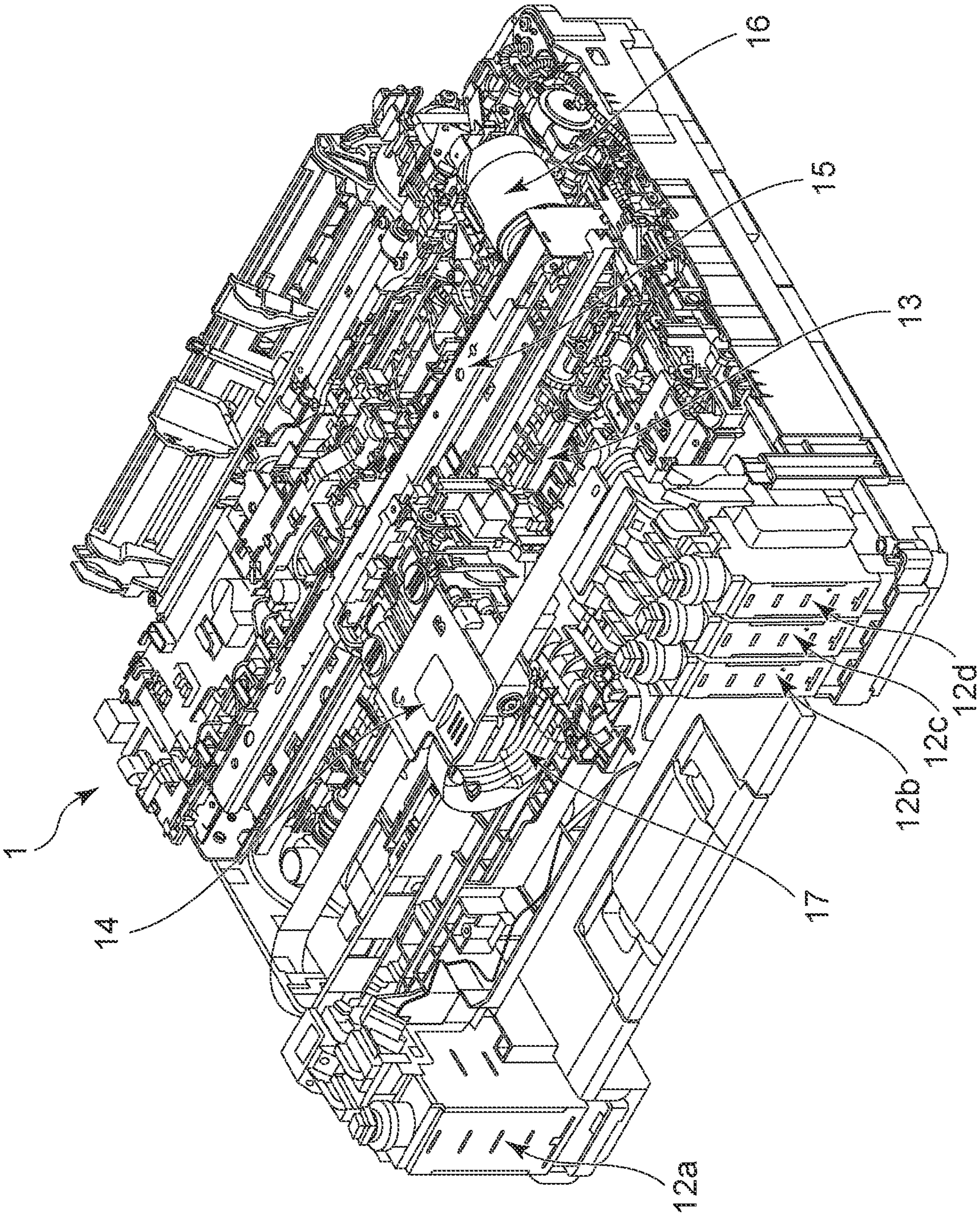
FIG. 2 is a perspective view showing the internal configuration of the liquid discharge apparatus.

FIG. 2 is a perspective view showing the internal configuration of a relevant part of the liquid discharge apparatus 1 shown in FIG. 1. In FIG. 2, the liquid discharge apparatus 1 includes a conveying roller 13 for conveying a record medium (not shown), a carriage 15 provided with a recording head 14 that discharges liquid, and a carriage motor 16 for driving the carriage 15. In other words, the liquid discharge apparatus 1 of the present embodiment is a so-called serial ink jet recording apparatus. A record medium is a medium on which an image is formed by liquid discharged from the recording head 14. Examples of the record medium include paper, cloth, optical disk label side, plastic sheet, and overhead projector (OHP) sheet.

The liquid container tanks 12 are fixedly mounted in the liquid discharge apparatus 1. Each of the liquid storage tanks 12 is a tank that contains liquid. Liquid contained in each liquid storage tank 12 is supplied to the recording head 14 via a liquid channel 17 and is discharged from the recording head 14. When the liquid discharge apparatus 1 is an ink jet recording apparatus, the liquid is so-called ink. Here, four-color (for example, cyan, magenta, yellow, and black) inks are used as liquid, and the four-color liquid storage tanks 12*a* to 12*d* that respectively contain color inks. In other words, black ink is contained in the liquid storage tank 12*a*, cyan ink is contained in the liquid storage tank 12*b*, magenta ink is contained in the liquid storage tank 12*c*, and yellow ink is contained in the liquid storage tank 12*d*. The liquid storage tanks 12*a* to 12*d* each are disposed at the front side portion of the liquid discharge apparatus 1 inside the casing 11.

Figure 3A:
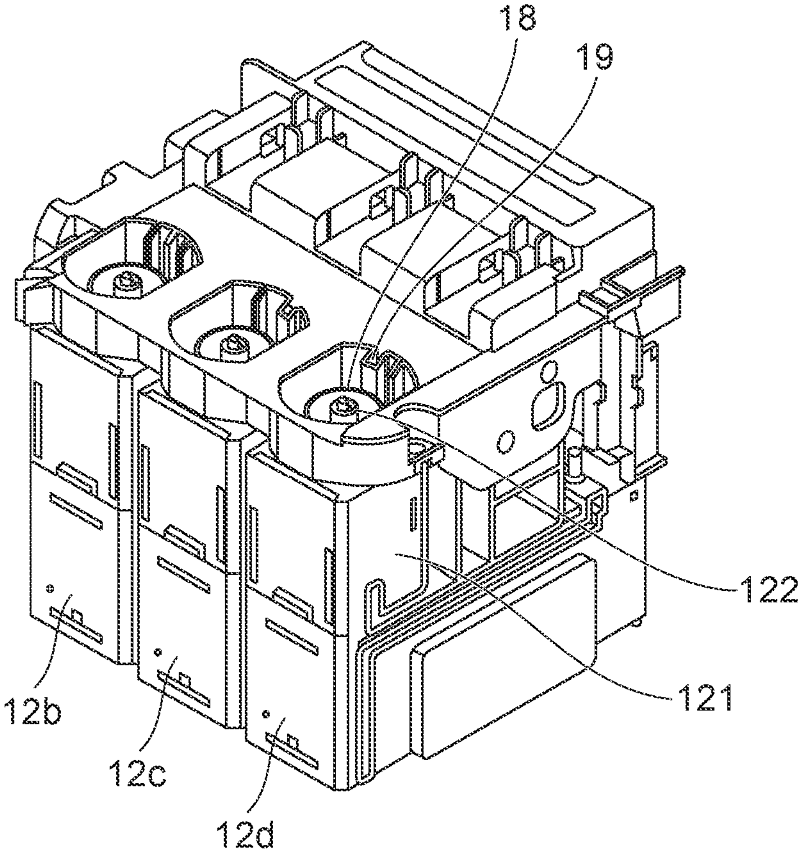
FIG. 3A is an enlarged perspective views of a portion in which liquid storage tanks are stored.
Figure 3B:
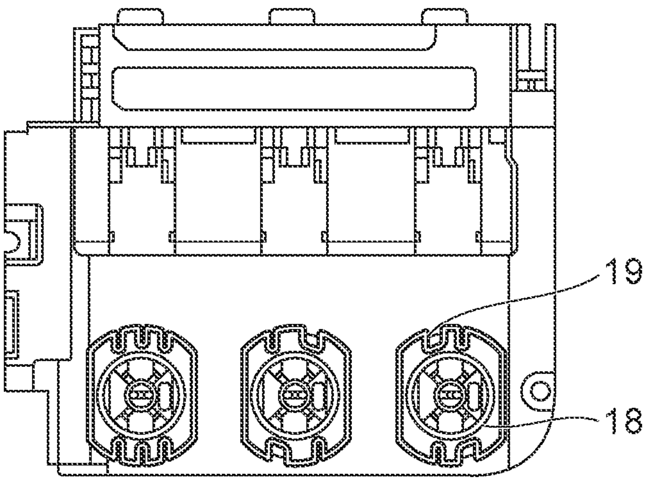
FIG. 3B is an enlarged plan views of the portion in which the liquid storage tanks are stored.

FIG. 3A is an example of an enlarged perspective view of a portion of the liquid discharge apparatus 1 shown in FIGS. 1 and 2 where the liquid storage tanks 12*b* to 12*d* are stored. FIG. 3B is a plan view of the portion where the liquid storage tanks 12*b* to 12*d* shown in FIG. 3A are stored when viewed from above. Each of the liquid storage tanks 12 includes a liquid storage tank body 121 for containing liquid, and a communication channel 122 that communicates with a liquid chamber in the liquid storage tank body 121. In addition, the liquid storage tank 12 includes an attachable tank cover (not shown) to, during times other than during refilling of liquid, cover the communication channel 122 and hermetically seal the liquid chamber inside the liquid storage tank body 121. To refill the liquid storage tank 12 with liquid, the tank cover is opened, the outlet 22*a* of a liquid refill container 2 (described later) is inserted in the communication channel 122, and liquid is poured. When the liquid chamber is hermetically sealed with the tank cover during times other than during refilling of liquid, it is possible to reduce evaporation of liquid inside the liquid storage tank 12. The communication channel 122 includes two channels extending in parallel with each other in a vertical direction inside, and liquid in the liquid refill container 2 is configured to be poured into the liquid storage tank 12 by gas-liquid exchange. A socket 18 is provided at a portion of the liquid discharge apparatus 1 where the outlet 22*a* of the liquid refill container 2 is inserted. The socket 18 has protruding portions 19 that protrude inward from an inner peripheral wall. The socket 18 is provided for each liquid storage tank 12 and the shape of the protruding portions 19 is varied among the sockets 18. Only the liquid refill container 2 associated with the shape of the protruding portions 19 is able to be fitted to the socket 18. Thus, it is possible to prevent a refill mistake of liquid (a mistake of color). The protruding portions 19 are provided symmetrically at 180° with respect to the central axis of the communication channel 122. When recessed portions to be engaged with the protruding portions 19 of the socket 18 of the liquid discharge apparatus 1 are provided at the pouring portion 22 of the liquid refill container 2, it is possible to position the liquid refill container 2 with the socket 18, and it is possible to pour predetermined liquid to the liquid storage tank 12.

Liquid Refill Container

Figure 4:
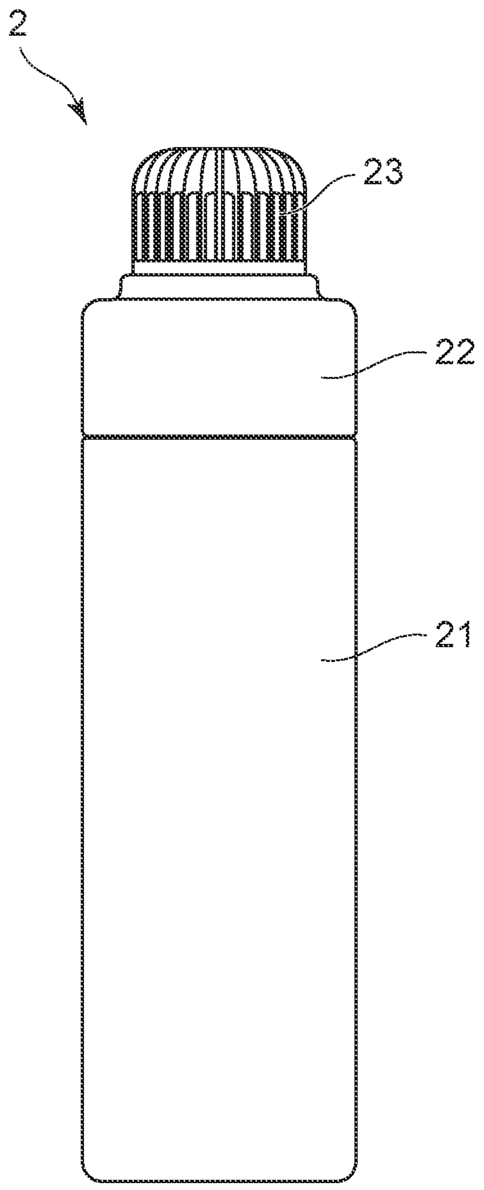
FIG. 4 is a side view showing the outer appearance of a liquid refill container.

FIG. 4 is a side view showing the outer appearance of the liquid refill container 2 to refill the liquid storage tank 12 with liquid.

The liquid refill container 2 includes a liquid storage portion 21 that contains liquid, a pouring portion 22 connected to the liquid storage portion 21, and a cap portion 23 attached to the pouring portion 22. The liquid refill container 2 has a bottle shape as a whole.

The liquid storage portion 21 contains liquid, occupies a half or more length of the liquid refill container 2 in the longitudinal direction, and serves as a main body portion of the liquid refill container 2. Since the liquid storage portion 21 is a portion that contains liquid, the liquid storage portion 21 can occupy two thirds or more of the length of the liquid refill container 2 in the longitudinal direction when the capacity is taken into consideration.

As will be described later, the liquid storage portion 21 is made of a metal. The pouring portion 22 has an outlet 22*a* that is an outlet at the time of pouring liquid contained in the liquid storage portion 21. The pouring portion 22 is a portion having the function of pouring liquid. The cap portion 23 is attached to the pouring portion 22 and covers the outlet 22*a*. The cap portion 23 has a role in isolating the inside of the liquid storage portion 21 from outside air.

Figure 5A:
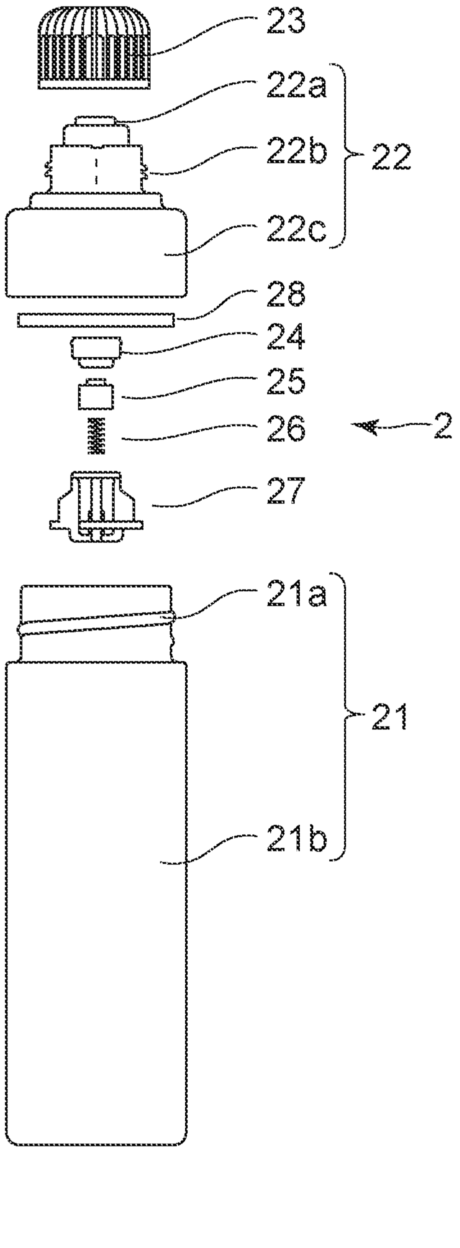
FIG. 5A is an exploded side view showing the parts of the liquid refill container.
Figure 5B:
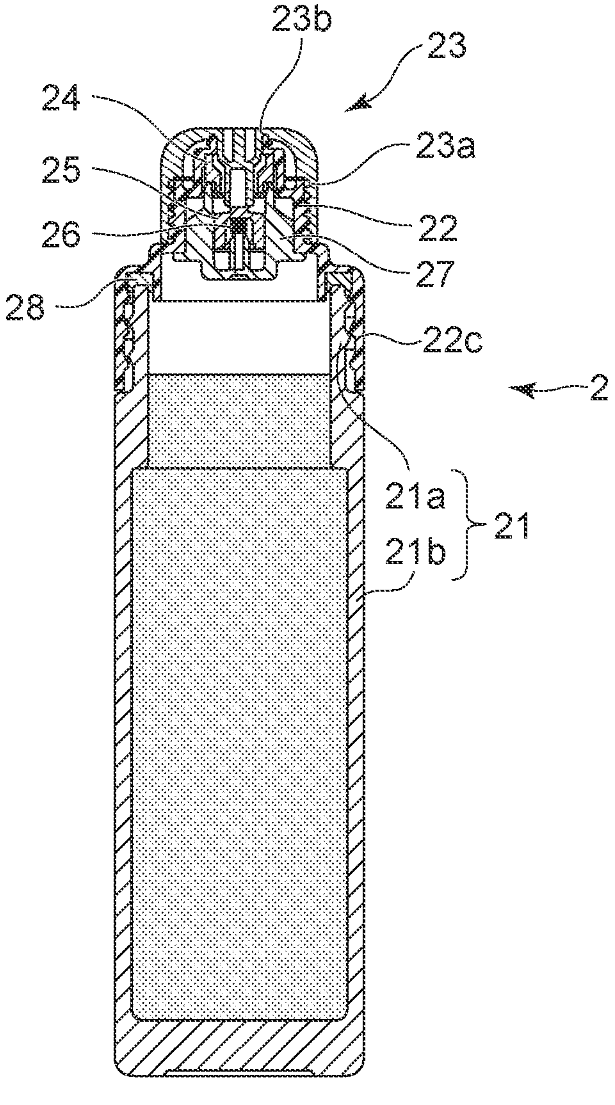
FIG. 5B is a cross-sectional view showing the parts of the liquid refill container.

FIGS. 5A and 5B show the parts of the liquid refill container 2 of FIG. 4. FIG. 5A is an exploded side view of the parts of the liquid refill container 2. FIG. 5B is a cross-sectional view of the liquid refill container 2 after the parts of the liquid refill container 2 shown in FIG. 5A are assembled. The liquid storage portion 21 of the liquid refill container 2 is made up of a bottle threaded portion 21*a* formed at the upper part, and a bottle storage portion 21*b* formed at the lower part. The bottle threaded portion 21*a* and the bottle storage portion 21*b* are integrated and are made of the same metal. The pouring portion 22 is made up of an outlet 22*a* for pouring liquid, a nozzle external threaded portion 22*b* on which an external thread structure is formed on the outer side, and a nozzle internal threaded portion 22*c* on which an internal thread structure is formed on the inner side. The pouring portion 22 is made of a resin. Examples of the material used to form the pouring portion 22 include polyethylene (PE) and polypropylene (PP).

The nozzle internal threaded portion 22*c* of the pouring portion 22 is screwed to the bottle threaded portion 21*a* of the liquid storage portion 21. The pouring portion 22 is attached to the liquid storage portion 21 by means of screwing. Packing 28 is disposed at the connecting portion between the pouring portion 22 and the liquid storage portion 21. The packing 28 seals the connecting portion. The packing 28 has flexibility. Examples of the material used to form the packing 28 include butyl rubber, fluororubber, hydrogenated nitrile rubber, ethylene propylene dien monomer (EPDM), and silicone rubber.

Figure 7A:
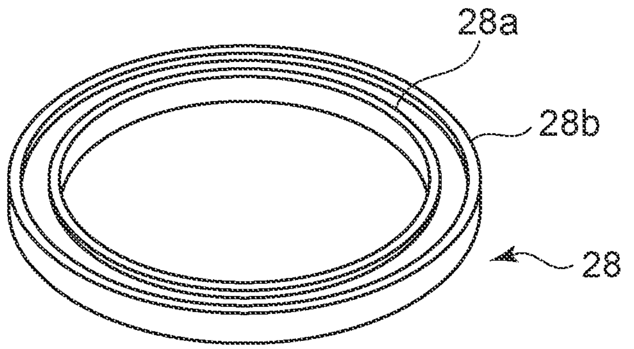
FIGS. 7A to 7C are perspective views each showing the structure of packing.
Figure 7B:
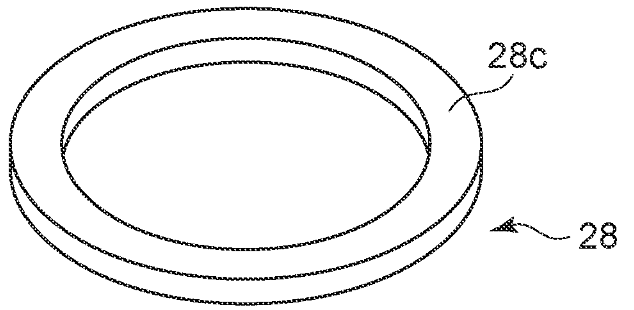
Figure 7C:
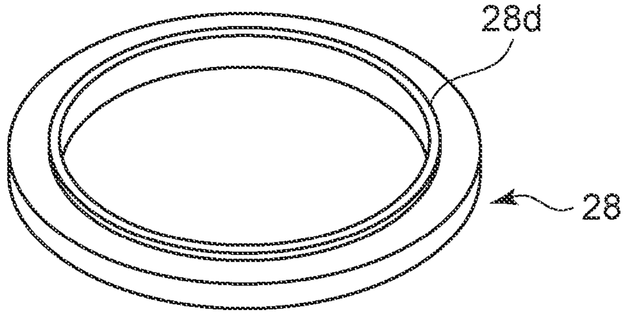

FIGS. 7A to 7C are perspective views each showing the packing 28. The packing 28 having a structure shown in FIG. 7A has two annular projections 28*a*, 28*b* on the liquid storage portion side. The structure of the packing 28 is the same as that of the packing 28 shown in FIG. 5B. The area between the projections 28*a*, 28*b* is in contact with the liquid storage portion 21. The side faces of projections 28*a*, 28*b* are also in contact with the liquid storage portion 21. The projections 28*a*, 28*b* sandwich both sides of a contact surface to increase sealing property. The packing 28 shown in FIG. 7B has no projection, and a portion on the liquid storage portion side is a flat smooth surface 28*c*. By not providing a projection on the liquid storage portion side of the packing 28, it is beneficial that the packing 28 and the liquid storage portion 21 are easily positioned. The packing 28 shown in FIG. 7C has an annular projection 28*d* on the liquid storage portion side. When the number of projections is one, it is possible to ensure positioning and sealing in a balanced manner. A projection of the packing 28 may be provided at a portion on the pouring portion side. A projection may be in contact with a member of the pouring portion and caused to be deformed.

The rubber hardness of the packing 28 is preferably a Shore D hardness of higher than or equal to 10 and more preferably a Shore D hardness of higher than or equal to 30. When the Shore D hardness is too low, sealing decreases. On the other hand, when the Shore D hardness is too high as well, the packing 28 is hard to deform, and sealing also decreases. In terms of this point, the Shore D hardness is preferably lower than or equal to 80, more preferably lower than or equal to 55, and further preferably lower than or equal to 45.

The structure around the cap portion 23 will be described. As shown in FIG. 5B, a cap threaded portion 23*a* having an internal thread structure is disposed on the inner side of the lower part of the cap portion 23. The cap threaded portion 23*a* is screwed to the nozzle external threaded portion 22*b* of the pouring portion 22. A cap seal portion 23*b* is provided at the upper side of the cap portion 23. The cap seal portion 23*b* and part of the outlet 22*a* are fitted to each other by means of screwing, and the outlet 22*a* is hermetically sealed. As described above, the nozzle internal threaded portion 22*c* is screwed to the bottle threaded portion 21*a*, and the pouring portion 22 and the liquid storage portion 21 are joined by means of screwing.

The liquid storage portion 21 of the liquid refill container 2 is made of a metal. The metal used to form the liquid storage portion 21 can be, for example, any one of a stainless steel, a steel, a porcelain enamel, and aluminum. After liquid is poured from the liquid refill container 2 to the liquid storage tank 12, the liquid refill container 2 is collected, and the metal liquid storage portion 21 is washed. Thus, it is possible to reuse the liquid storage portion 21. Examples of a washing method for the liquid storage portion 21 include a washing method using water or hot water and a washing method using a predetermined detergent. After washing, when liquid is poured into the liquid storage portion 21 again and the liquid storage portion 21 is set in the liquid refill container 2 for use, the liquid refill container 2 is reusable, so it is environmentally beneficial. Although a scheme to reuse the liquid refill container 2 will be described later, it is easy to wash the liquid refill container 2 because the liquid refill container 2 is made of a metal. When the liquid refill container 2 is made of a resin, liquid adhering to the liquid refill container 2 may be difficult to be completely removed. When the liquid refill container 2 is made of a metal, the liquid refill container 2 is less prone to degradation even when washed and filled with liquid again, so it is more suitable to be reused as a liquid refill container. For the above reasons, in the embodiment of the present disclosure, the liquid refill container 2 is made of a metal usually not used for a liquid refill container for refilling a liquid discharge apparatus with liquid.

The internal capacity of the liquid storage portion 21 is not limited. On the assumption that liquid is poured into the liquid storage tank 12 and is discharged from a liquid discharge head of a liquid discharge apparatus, the internal capacity of the liquid storage portion 21 is preferably greater than or equal to 10 ml and less than or equal to 200 ml. Examples of the shape of a cross section perpendicular to the height direction (longitudinal direction) of the liquid storage portion 21 include circle, square, and rectangle. The liquid storage portion 21 can have a cylindrical shape or a rectangular parallelepiped shape.

A seal 24 is provided on the inner side of the pouring portion 22. The seal 24 has an opening (orifice portion) at its tip end. The communication channel 122 is to be inserted in the opening. When the cap portion 23 is opened and the communication channel 122 is not inserted, a valve 25 (a valve element) is urged by a spring 26 (a biasing mechanism) toward the opening to seal the opening. Examples of the material used to form the seal 24 include a rubber and an elastomer. Examples of the material used to form the valve 25 include polyethylene (PE) and polypropylene (PP). Examples of the material used to form the spring 26 include a stainless steel. An end portion of the spring 26 on the side opposite to the valve 25 side is fixed by a holder 27. Examples of the material used to form the holder 27 include polyethylene (PE) and polypropylene (PP). The holder 27 is fixed to the pouring portion 22 by welding.

At the time of refilling (supplying) the liquid storage tank 12 with liquid from the liquid refill container 2, initially, the cap portion 23 is removed. Then, the liquid refill container 2 is fitted to the liquid storage tank 12. Thus, the liquid discharge apparatus-side communication channel 122 (FIG. 3A) is inserted into the pouring portion 22 through the opening of the seal 24 of the liquid refill container 2. The valve 25 is opened as a result of the insertion. Liquid in the liquid refill container 2 is supplied to the liquid chamber of the liquid storage tank body 121 via the communication channel 122 due to the water head difference.

As shown in FIG. 5B, by providing the cap portion 23 with a protrusion, the valve 25 is opened by the protrusion at the time when the cap portion 23 is removed. Thus, when the air pressure in the liquid refill container 2 is higher than the outside air pressure as well, flooding of liquid from the liquid storage tank 12 as a result of rapid inflow of liquid into the liquid storage tank 12 is reduced at the time of supplying the liquid storage tank 12 with liquid.

As described above, when the nozzle internal threaded portion 22*c* is screwed to the bottle threaded portion 21*a*, the pouring portion 22 is attached to the liquid storage portion 21. Here, a user removes the cap portion 23 from the pouring portion 22 by rotating the cap portion 23 and pours liquid. However, if a user erroneously rotates (rotates in a direction opposite to the rotation direction of screwing) between the pouring portion 22 and the liquid storage portion 21 and separates the pouring portion 22 and the liquid storage portion 21 from each other, liquid may adhere to the hand. To reduce the possibility, the cap portion 23 and the liquid storage portion 21 can be in different color systems, and the pouring portion 22 and the liquid storage portion 21 can be in the same color system. Since the liquid storage portion 21 is made of a metal, when the liquid storage portion 21 is not colored, the liquid storage portion 21 mostly has a gray color with the L* value of L*a*b* color specification system in the CIE color specification system in a range of greater than or equal to 10 and less than or equal to 95. For this reason, in this case, the pouring portion 22 can also have a gray color with the L* value of L*a*b* color specification system in the CIE color specification system in a range of greater than or equal to 10 and less than or equal to 95. On the other hand, the cap portion 23 has a color of which the L* value does not fall within the range greater than or equal to 10 and less than or equal to 95, that is, for example, a white color.

As another method that prevents a user from rotating the pouring portion 22 and the liquid storage portion 21 relative to each other to separate the pouring portion 22 and the liquid storage portion 21 from each other, there is a method of setting rotation directions. This is a method to set the rotation directions at the time of screwing the pouring portion 22 and the liquid storage portion 21 to each other to reverse directions (opposite directions) to the rotation directions at the time of screwing the cap portion 23 and the pouring portion 22 to each other. In this case, of course, the rotation directions for separation are respectively reverse directions, so a user is difficult to erroneously rotate the pouring portion 22 and the liquid storage portion 21 in a separating direction. More specifically, when the cap portion 23 is rotated in the clockwise direction with respect to the pouring portion 22 to screw the cap portion 23 and the pouring portion 22, the rotation direction can be, on the contrary, set such that the pouring portion 22 is rotated in the counterclockwise direction with respect to the liquid storage portion 21 to screw the pouring portion 22 and the liquid storage portion 21 to each other.

Reuse System

An example of a reuse system for a liquid refill container will be described below. A user who newly purchases a liquid discharge apparatus or a user who already owns a liquid discharge apparatus makes a contract on a use of a liquid refill container with a maker that manufactures liquid refill containers. In accordance with the contract, a liquid refill container is delivered from the maker to the user. The user pours liquid in the liquid refill container into the liquid storage tank to refill liquid into the liquid storage tank. An empty liquid refill container is returned from the user to the maker. The maker removes the liquid storage portion from the returned liquid refill container and washes the liquid storage portion, and manufactures a liquid refill container by reusing the liquid storage portion and assembling the pouring portion and the cap portion to the liquid storage portion. On the other hand, the user orders a liquid refill container to the maker at the stage at which a predetermined amount of liquid in the liquid storage tank of the liquid discharge apparatus has been used. In accordance with a request from the user, the maker delivers a liquid refill container to the user again. The user supplies the liquid storage tank with liquid in the delivered liquid refill container and returns the empty liquid refill container to the maker again. When the liquid storage portion is circulated between the maker and the user in this way, the liquid refill container can be reused. In this way, a liquid refill container delivered from the maker can be the one washed and reused from a liquid refill container returned in the past from the user who has ordered the liquid refill container. However, a liquid refill container returned from another user may also be washed, reused, and delivered. An order for a liquid refill container may be automatically placed in accordance with the amount of usage of liquid in a liquid discharge apparatus or a usage period of the apparatus itself.

The above-described example is a scheme that assumes to wash and reuse only the liquid storage portion 21. The pouring portion 22 and the cap portion 23 are difficult to be washed when made of a resin, and an assembly inside the pouring portion 22 is also difficult to be washed by removing the assembly, so, when only the liquid storage portion 21 is reused, reliability as a liquid refill container improves. However, parts other than the liquid storage portion 21 may be washed and reused. The packing 28 in the liquid refill container 2 is difficult to be reused due to concerns about creep; however, parts other than the packing 28 are relatively easily reused. A washing method for parts may be a washing method similar to that of the liquid storage portion 21 (described later).

Figure 6:
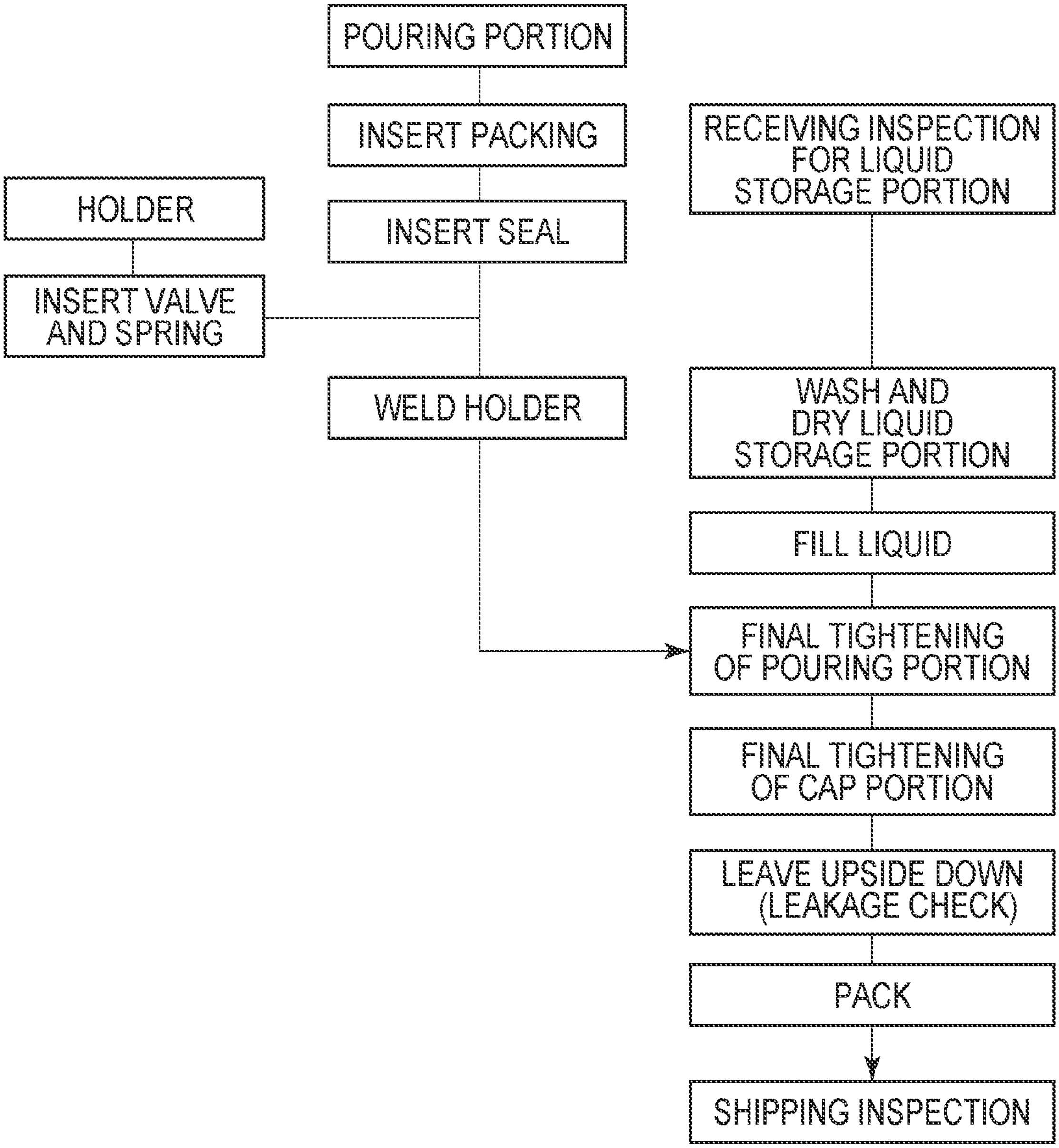
FIG. 6 is a flowchart of a manufacturing method for a liquid refill container.

The flow of a manufacturing method for the liquid refill container 2 will be described with reference to FIG. 6. The packing 28 and the seal 24 are press-fitted and inserted to the pouring portion 22 by using a handpress or the like. The valve 25 and the spring 26 are inserted into the holder 27. The assembled pouring portion 22 and holder 27 are welded to each other by using ultrasonic welding or the like to make a unit part of the pouring portion 22.

On the other hand, outer appearance inspection, washing, and drying processes are performed on the liquid storage portion 21. The reused liquid storage portion 21 may have adhering liquid inside. For this reason, the inside of the liquid storage portion 21 is washed. The description will be made with reference to a specific example. Initially, the liquid storage portion 21 is immersed in pure water for 30 minutes to clean adhering liquid. Subsequently, the liquid storage portion 21 is washed for 60 minutes by using 60° C. pure water (hot water), and dried for 120 minutes in a tank at 60° C.

Processes after that will be described with reference to a specific example. After liquid is poured into the dried liquid storage portion 21, the unit part of the pouring portion 22 is assembled. A torque during the assemblage is assumed as 4.0 N·m. Subsequently, the cap portion 23 is assembled to the pouring portion 22. A torque during the assemblage is assumed as 2.0 N·m. The finished liquid refill container 2 undergoes a decompressed upside down test under an environment of 0.6 MPa for 60 minutes, and liquid leakage from the packing 28 and the cap portion 23 is inspected. After the inspection is passed, the liquid refill container 2 is packed and shipped to a user.

In this way, a liquid refill container is able to be reused.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. A liquid refill container for refilling a liquid discharge apparatus with liquid, the liquid refill container comprising:
- a liquid storage portion made of a metal and configured to contain the liquid;
- a pouring portion removeably connected to the liquid storage portion and having an outlet for pouring the liquid; and
- a cap portion removeably attached to the pouring portion and covering the outlet,
- wherein a liquid stop valve is provided inside the pouring portion,
- wherein the liquid stop valve includes an orifice portion, a valve element, and a biasing mechanism including a spring configured to bias the valve element,
- wherein the biasing mechanism closes a gap between the orifice portion and the valve element, and
- wherein the cap portion has a protrusion, and the liquid stop valve is configured to open by the protrusion at a time when the cap portion is removed.

2. The liquid refill container according to claim 1, wherein the metal is any one of the following: a stainless steel, a steel, a porcelain enamel, or aluminum.

3. The liquid refill container according to claim 1, wherein the pouring portion is made of a resin.

4. The liquid refill container according to claim 1, wherein the cap portion is in a color system that is different from a color system in which the pouring portion is in.

5. The liquid refill container according to claim 4, wherein the cap portion has a color with an L* value that does not fall within a range greater than or equal to 10 and less than or equal to 95.

6. The liquid refill container according to claim 1, wherein the liquid storage portion occupies two thirds or more of a length of the liquid refill container in a longitudinal direction.

7. The liquid refill container according to claim 1, wherein the pouring portion has a recessed portion which engage with a protruding portion that is disposed in a socket of the liquid discharge apparatus where an inserted outlet is inserted.

8. The liquid refill container according to claim 1, wherein the liquid refill container is configured to contain ink as the liquid.

9. The liquid refill container according to claim 1, wherein the liquid discharge apparatus comprises a liquid storage tank and the liquid is to be supplied by the pouring portion being fitted to the liquid storage tank.

10. A liquid refill container for refilling a liquid discharge apparatus with liquid, the liquid refill container comprising:

a liquid storage portion made of a metal and configured to contain the liquid;

a pouring portion removeably connected to the liquid storage portion and having an outlet for pouring the liquid; and a cap portion removeably attached to the pouring portion and covering the outlet, wherein a liquid stop valve is provided inside the pouring portion, wherein the liquid stop valve includes an orifice portion, a valve element, and a biasing mechanism configured to bias the valve element, wherein the biasing mechanism closes a gap between the orifice portion and the valve element, and wherein the pouring portion has a recessed portion which engage with a protruding portion that is disposed in a socket of the liquid discharge apparatus where an inserted outlet is inserted.

11. A liquid refill container for refilling a liquid discharge apparatus with liquid, the liquid refill container comprising:

a liquid storage portion made of a metal and configured to contain the liquid;

a pouring portion removeably connected to the liquid storage portion and having an outlet for pouring the liquid; and a cap portion removeably attached to the pouring portion and covering the outlet, wherein a liquid stop valve is provided inside the pouring portion, wherein the liquid stop valve includes an orifice portion, a valve element, and a biasing mechanism configured to bias the valve element, wherein the biasing mechanism closes a gap between the orifice portion and the valve element, wherein the cap portion is in a color system that is different from a color system in which the pouring portion is in, and wherein the cap portion has a color with an L* value that does not fall within a range greater than or equal to 10 and less than or equal to 95.

* * * * *